3,014,910
NITROGENOUS ORGANIC COMPOUNDS
OF PHOSPHORUS
Gail H. Birum, Dayton, Ohio, assignor to Monsanto
Chemical Company, St. Louis, Mo., a corporation of
Delaware
No Drawing. Filed Dec. 15, 1958, Ser. No. 780,201
6 Claims. (Cl. 260—293)

The present invention relates to nitrogenous organic compounds of phosphorus, and more particularly provides a new and valuable class of phosphinyl phosphoramidites and the method of preparing the same.

According to the invention, there are prepared certain bis(phosphinylhydrocarbyl) phosphoramidites by the reaction of a phosphoramidous dichloride with a triorgano phosphite and an aldehyde, substantially according to the scheme

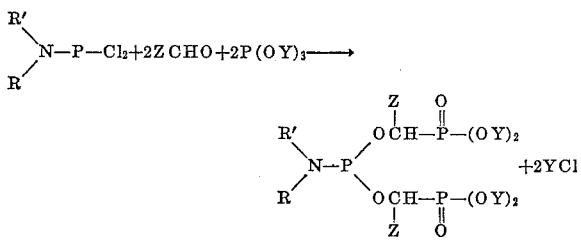

in which R is an alkyl radical of from 1 to 5 carbon atoms, R' is selected from the class consisting of R and a benzenoid radical of from 6 to 7 carbon atoms and in which R and R' taken together stand for a bivalent alkylene radical of from 4 to 5 carbon atoms; Z is selected from the class consisting of hydrogen and hydrocarbyl radicals which are free of aliphatic unsaturation and which contain from 1 to 8 carbon atoms; and Y is selected from the class consisting of alkyl and haloalkyl radicals of from 1 to 8 carbon atoms.

A presently useful class of phosphoramidous dichlorides are the dialkylphosphoramidous dichlorides having from 1 to 5 carbon atoms in the alkyl radical, e.g., dimethyl-, diethyl-, di-n-propyl-, diisopropyl-, di-n-butyl-, di-tert-butyl-, di-n-pentyl-, diisopentyl-, ethylmethyl-, butylpropyl- or methyl-n-pentylphosphoramidous dichloride.

Another class of presently useful phosphoramidous dichlorides includes the alkylphenylphosphoramidous dichlorides and the alkyltolylphosphoramidous dichlorides such as methylphenyl-, ethylphenyl-, phenyl-n-propyl-, isopropylphenyl-, n-butylphenyl-, or n-pentylphenylphosphoramidous dichloride or methyl-p-tolyl-, ethyl-o-tolyl-, n-propyl-p-tolyl-, n-butyl-m-tolyl-, isobutyl-o-tolyl-, n-pentyl-p-tolyl-, isopentyl-o-tolyl-, methyl-o-tolyl, or ethyl-p-tolylphosphoramidous dichloride.

Still another class of the presently useful phosphorus dichlorides includes piperidinophosphonous dichloride

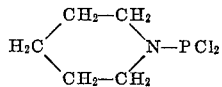

and the homologous pyrrolidonophosphonous dichloride.

The presently useful aldehydes are formaldehyde and the hydrocarbon aldehydes which are free of olefinic and acetylenic unsaturation. They include, in addition to formaldehyde, the alkanecarboxaldehydes such as acetaldehyde, propionaldehyde, n-butyraldehyde, isobutyraldehyde, valeraldehyde, isovaleraldehyde, n-hexaldehyde, n-heptaldehyde, 2-ethylhexaldehyde, n-octaldehyde, and branched-chain nonanal derived from "Oxo" process nonanol; the benzenoid aldehydes such as benzaldehyde, o-, m- or p-tolualdehyde, o-, m- or p-ethylbenzaldehyde, phenylacetaldehyde and 2-phenylpropionaldehyde, and the cycloparaffinic aldehydes such as cyclohexanecarboxaldehyde or 2-methylcyclopentanecarboxaldehyde, etc.

Triorgano phosphites useful for the present purpose are the simple trialkyl phosphites, such as trimethyl, triethyl, tri-n-propyl, triisopropyl, tri-n-butyl, triisopentyl, tri(2-ethylhexyl), tri-n-hexyl or tri-n-octyl phosphite; the mixed trialkyl phosphites such as dimethyl ethyl, diamyl propyl, ethyl methyl propyl, or n-octyl dimethyl phosphite; the simple haloalkyl phosphites such as tris(2-chloroethyl), tris(2-chloropropyl), tris(3-bromopropyl), tris(dichloroethyl) and tris[3 - bromo - 2 - choloropropyl) phosphite; the mixed haloalkyl phosphites, such as 2-chloroethyl bis(3-bromopropyl) phosphite or 2-chloroethyl 4-bromobutyl 2-chloromethyl phosphite; the mixed phosphites of both paraffinic and haloparaffinic alcohols such as bis(2-chloroethyl) methyl phosphite or 2-chloropropyl diethyl phosphite.

Reaction of the dihydrocarbylphosphoramidous dichloride with formaldehyde and a trialkyl phosphite or a tris(haloalkyl) phosphite yields bis[(dialkoxyphosphinyl)methyl] dihydrocarbylphosphoramidites when a trialkyl phosphite is used or bis{[bis-(haloalkyl)phosphinyl]methyl} dihydrocarbylphosphoramidites when a tris(haloalkyl) phosphite is used, i.e., compounds of the formula

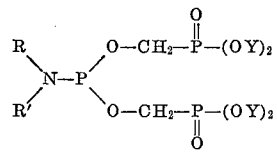

wherein R is an alkyl radical of from 1 to 5 carbon atoms, R' is selected from the class consisting of R and benzenoid radicals of from 6 to 7 carbon atoms and Y is selected from the class consisting of alkyl and halogen-substituted alkyl radicals of from 1 to 8 carbon atoms. Thus, from methylpropylphosphoramidous dichloride and substantially two moles each of formaldehyde and of trimethyl phosphite there is obtained bis[(dimethoxyphosphinyl)methyl] methylpropylphosphoramidite, i.e., a compound of the formula in which R is methyl, R' is propyl and Y is ethyl. Similarly, from diethylphosphoramidous dichloride, formaldehyde and tris(2-chloroethyl) phosphite there is obtained bis{bis[(2-chloroethoxy)phosphinyl]methyl} diethylphosphoramidite; and from ethyl-p-tolylphosphoramidous dichloride and trioctyl phosphite there is obtained bis[(dioctyloxyphosphinyl)methyl] ethyl-p-tolylphosphoramidite.

The reaction of a dihydrocarbylphosphoramidous dichloride with an alkanecarboxaldehyde and a trialkyl or tris(haloalkyl)phosphite gives either bis[1-(dialkoxyphosphinyl)alkyl] dihydrocarbylphosphoramidites or bis{1-[bis(haloalkoxy)phosphinyl]alkyl} dihydrocarbylphosphoramidites, depending upon whether a trialkyl phosphite or a tris(haloalkyl) phosphite is used, i.e., the products thus obtained have the formula

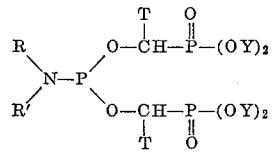

where R is an alkyl radical of from 1 to 5 carbon atoms, R' is selected from the class consisting of R and benzenoid radicals of from 6 to 7 carbon atoms, and T and Y are alkyl radicals of from 1 to 8 carbon atoms. Thus, the reaction product of ethylpentylphosphoramidous dichloride, acetaldehyde and tri-n-propyl phosphite gives a compound in which R of the above formula is ethyl, R' is pentyl, T is methyl and Y is propyl, i.e., bis[1-(dipropoxyphosphinyl)ethyl] ethylpentylphosphoramidite. Other compounds provided by the invention from a dihydrocarbylphosphoramidous dichloride, an alkanecarboxaldehyde and a trialkyl or tris(haloalkyl) phosphite are as follows:

Bis[1-(dimethoxyphosphinyl)propyl] dimethylphosphoramidite

Bis[1-(diethoxyphosphinyl)ethyl] diethylphosphoramidite

Bis[1-(diethoxyphosphinyl)-2-ethylhexyl] methylphenylphosphoramidite

Bis[1-(dihexyloxyphosphinyl)ethyl] di-n-butylphosphoramidite

Bis{1-[bis(2-bromoethoxy)phosphinyl]dodecyl} ethyl-p-tolylphosphoramidite

Bis{1-[bis(2-chloropropoxy)phosphinyl]butyl} di-n-pentylphosphoramidite

Bis{1-[bis(2-ethylhexyloxy)phosphinyl]propyl} isopentylphenylphosphoramidite

Bis{1-[bis(2-iodoethoxy)phosphinyl]ethyl} methylphenylphosphoramidite

Bis[1-(diethoxyphosphinyl)ethyl dimethylphosphoramidite

Bis{1-[bis(2-chloropropoxy)phosphinyl]-2-methylpropyl} di-n-propylphosphoramidite Bis{1-[bis(2-chloroethoxy)phosphinyl]butyl} methyl-o-tolylphosphoramidite Employing a benzenoid carboxaldehyde with the dihydrocarbylphosphoramidous dichloride and a trialkyl phosphite yields the bis[1-dialkoxyphosphinyl)aralkyl] dihydrocarbylphosphoramidites, i.e., compounds of the formula

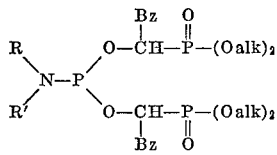

in which R and R' are the hydrocarbyl radicals defined above, Bz denotes a benzenoid radical of from 6 to 8 carbon atoms and alk denotes an alkyl radical of from 1 to 8 carbon atoms. Thus, methylphenylphosphoramidous dichloride, benzaldehyde and trimethyl phosphite give bis[α-(dimethoxyphosphinyl)benzyl] methylphenylphosphoramidite; di-n-propylphosphoramidous dichloride, p-tolualdehyde and tris(2-chloroethyl) phosphite gives bis{α-[bis(2-chloroethoxy)phosphinyl]-p - methylbenzyl} di-n-propylphosphoramidite; methyl-p-tolylphosphramidous dichloride, phenylacetaldehyde and triethyl phosphite gives bis[α-(diethoxyphosphinyl)-2-phenylethyl] methyl-p-tolylphosphoramidite; diethylphosphoramidous dichloride, o-tolualdehyde and tri-n-butyl phosphite gives bis[α-(di-n-butoxyphosphinyl)-o-methylbenzyl] diethylphosphoramidite; ethylphenylphosphoramidous dichloride, benzaldehyde and tetrachlorododecyl phosphite gives bis{α-[bis(tetrachlorododecyloxy)phosphinyl]benzyl} ethylphenylphosphoramidite; dipentylphosphoramidous dichloride, p-ethylbenzaldehyde and triethyl phosphite gives bis[α-(diethoxyphosphinyl)-p-ethylbenzyl] dipentylphosphoramidite; pentylphenylphosphoramidous dichloride, benzaldehyde and tris(2-bromoethyl)phosphite gives bis{α - [bis(2 - bromoethoxy)phosphinyl]benzyl} pentylphenylphosphoramidite; butylphenylphosphoramidous dichloride, o-tolualdehyde and tris(2-fluoroethyl) phosphite gives bis{α-[bis(2-fluoroethoxy)phosphinyl] - o - methylbenzyl} butylphenylphosphoramidite, etc.

Cycloalkanecarboxaldehydes react as do the alkanecarboxaldehydes or the benzenoid carboxaldehydes with the dihydrocarbylphosphoramidous dichlorides and the triorgano phosphites. Thus, cyclohexanecarboxaldehyde, methylphenylphosphoramidous dichloride and trimethyl phosphite yield bis[(dimethoxyphosphinyl)(cyclohexyl)methyl] methylphenylphosphoramidite and di-n-butylphosphoramidous dichloride, cyclohexanecarboxaldehyde and tris(2-chloroethyl) phosphite yields bis{[(2-chloroethoxy)phosphinyl] (cyclohexyl)methyl} di-n-butylphosphoramidite.

When the dichloroamido phosphorus compound is piperidinophosphonous dichloride or pyrrolidinophosphonous dichloride, the products with formaldehyde and the triorgano phosphite are bis[(dialkoxyphosphinyl)methyl] or bis{[bis(haloalkyl)phosphinyl]methyl} piperidino- or pyrrolidinophosphonites, i.e., compounds of the formula

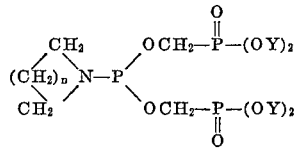

in which $n$ is an integer of 2 or 3 and Y is selected from the class consisting of alkyl and haloalkyl radicals of from 1 to 8 carbon atoms. Thus, piperidinophosphonous dichloride, formaldehyde and triethyl phosphite or tris(2-chloroethyl) phosphite yield either the bis[(diethoxyphosphinyl)methyl] or the bis{[bis(2-chloroethoxy)phosphinyl]methyl} piperidinophosphonite; and pyrrolidinophosphonous dichloride, formaldehyde, and tri-n-octyl phosphite or tris(2-chloropropyl) phosphite give either the bis[(di-n-octyloxyphosphinyl)methyl] or the bis{[bis(2-chloropropoxy)phosphinyl]methyl} pyrrolidinophosphonite.

Employing a hydrocarbon carboxaldehyde with the triorgano phosphite and the piperidino- or the pyrrolidinophosphonous dichloride, the presently provided compounds have the formula

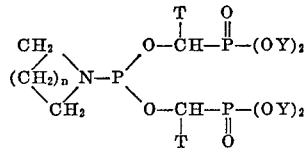

wherein $n$ is an integer of 2 to 3, T is a hydrocarbyl radical which is free of aliphatic unsaturation and contains from 1 to 8 carbon atoms, and Y is selected from the class consisting of alkyl and haloalkyl radicals of from 1 to 8 carbon atoms, i.e., there are provided either the bis[1-(dialkoxyphosphinyl)alkyl] or the bis{1-[bis(haloalkoxy)phosphinyl]alkyl} piperidinophosphonites or pyrrolidinophosphonites. Thus, the reaction of piperidinophosphonous dichloride, acetaldehyde and triethyl phosphite gives bis[1-(diethoxyphosphinyl)ethyl] piperidinophosphonite; piperidinophosphonous dichloride, benzaldehyde and triisooctyl phopshite gives bis[α-(diisooctyloxyphosphinyl)benzyl] piperidinophosphonite; tris(2-chloroethyl) phosphite, butyraldehyde and piperidinophosphonous dichloride gives bis{1-[bis(2-chloroethoxy)phosphinyl]butyl} piperidinophosphonite; trimethyl phosphite, octanal and pyrrolidinophosphonous dichloride gives bis[1-(dimethoxyphosphinyl)octyl] pyrrolidinophosphonite; tri-n-butyl phosphite, p-tolualdehyde, and pyrrolidinophosphonous dichloride gives bis[α-(di-n-butoxyphosphinyl)-p-methylbenzyl] pyrrolidinophosphonite; and tris(2-chloroethyl) phosphite, acetaldehyde and pyrrolidinophosphonous dichloride gives bis{1-[bis(2-chloroethoxy)phosphinyl]ethyl} pyrrolidinophosphonite.

Reaction of the dihydrocarbylphosphoramidous dichloride or the piperidino- or pyrrolidinophosphonous dichloride with the aldehyde and the triorgano phosphite is effected by simply mixing the three reactants at ordinary, decreased, or increased temperature and allowing the resulting reaction mixture to stand until formation of the diphosphinyl compound. As herein stated, the reaction proceeds by replacement of each of the two chlorine atoms of said dichloride with a (dialkoxyphosphinyl) hydrocarbyl or bis(haloalkoxyphosphinyl) hydrocarbyl radical. Two moles each of the aldehyde and of the triorgano phosphite are thus required per mole of the dichloride; and advantageously said dichloride, said aldehyde and said phosphite are used in a 1:2:2 ratio, for by employing this stoichiometric ratio there are obtained not only optimum yields, but there does not ensue the problem of separating excess unreacted material from the desired product. However, as will be apparent to those skilled in the art, the initial reaction mixture may consist of an excess of either the aldehyde or the phosphite; such an excess is simply separated from the diphosphinyl product. In a continuous process, the dichloride is gradually added to an equimolar mixture of the aldehyde and phosphite, while separating the diphosphinyl product from the reaction mixture as it is formed.

Generally, the reaction is moderately exothermic; hence, no external heating need be customarily employed. This is particularly true when the carbonyl compound is a lower alkanecarboxaldehyde. With such aldehydes application of cooling is usually advantageous in order to obtain smooth reaction. When working with such active aldehydes, optimum conditions comprise gradual addition of the aldehyde to the mixture of phosphite and dichloride with application of external cooling and thorough stirring. Usually it suffices to maintain the reaction temperature at, say, from 10° C. to 50° C. during addition of the aldehyde. When all of the aldehyde has been added to said mixture of phosphite and dichloride, and there is no longer any evidence of exothermic reaction, completion of the reaction may be assured by heating the reaction mixture to a temperature of from, say, 50° C. to 150° C. With the more sluggish aldehydes, e.g., 2-phenylacetaldehyde or n-octanal, it may be necessary to heat the reaction mixture moderately, say, to a temperature of about 50° C. before an exothermic reaction is initiated. Employing cyclohexanecarboxaldehyde and both a high molecular weight phosphite and a dichloride, even higher temperatures may be required, e.g., temperatures of from 100° C. to 150° C. appear to give the best yields. Since reactivity of the various reactants is thus known to vary, it is recommended that in each initial run the aldehyde and the mixture of phosphite and dichloride be mixed gradually at low temperatures and that external heating be employed only when there appears to be no spontaneous increase in temperature as a consequence of the mixing. Generally, the reaction takes place readily in the absence of an inert diluent or catalyst. However, catalysts and diluents or solvents may be employed. The use of diluents may be particularly advantageous when working with the highly active aldehydes; such diluents may be, e.g., benzene, toluene, dioxane, methylene chloride, or hexane. When employing no diluent and using substantially the stoichiometric proportion of reactants, i.e., two molar equivalents of the triorgano phosphite, two molar equivalents of the aldehyde and one molar equivalent of the dichloride, the reaction product may be used directly for a variety of industrial and agricultural purposes without purification, i.e., it consists essentially of the diphosphinyl product dissolved in the haloalkane which is produced as a by-product in the reaction. The diphosphinyl compound is readily obtained from this by-product by volatilizing the haloalkane to give the diphosphinyl product as residue.

The presently provided diphosphinyl dihydrocarbylphosphoramidites or piperidino- or pyrrolidinophosphonites are stable, generally high-boiling, materials which range from viscid liquids to waxy or crystalline solids. They are advantageously used as biological toxicants, e.g., as insecticides, fungicides, nematocides and bacteriostats.

The essentially aromatic, chlorine-containing materials, i.e., those obtained from an alkylarylphosphoramidous dichloride with an aromatic aldehyde and a tris(haloalkyl) phosphite are particularly useful as functional fluids, e.g., in force-transmission media and dielectric applications. The present compounds are generally useful as plasticizers for synthetic resins and plastics, as rubber-compounding chemicals; as flame-proofing agents for cellulosic and carbonaceous, combustible materials; and as pre-ignition glow-suppressors for hydrocarbon fuels containing organolead compounds.

The present invention is further illustrated by, but not limited to, the following examples:

Example 1

To a mixture consisting of 83 g. (0.50 mole) of triethyl phosphite and 34.8 g. (0.60 mole) of propionaldehyde there was added, with cooling, 52 g. (0.25 mole) of methylphenylphosphoramidous dichloride, during a time of about 10 minutes at a temperature of from 10° C. to 20° C. The reaction mixture was maintained at 45–55° C. for another 12 minutes, using occasional cooling. The resulting orange product was then warmed to 90° C., placed under water-pump vacuum at this temperature, and finally concentrated to 95° C./0.2 mm., to give as residue 132.5 g. of the substantially pure bis[1-(diethoxyphosphinyl)propyl] methylphenylphosphoramidite having the formula

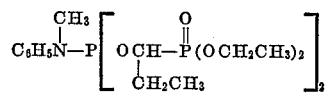

Example 2

To a mixture consisting of 88.0 g. (0.263 mole) of tri-n-hexyl phosphite and 27.9 g. (0.263 mole) of benzaldehyde in a nitrogen atmosphere there was added, with stirring, during 0.1 hour, 24.4 g. (0.132 mole) of piperidinophosphorodichloridite. A slight exothermal reaction was noted and when all of the chloridite had been added, the reaction mixture was warmed at 85–90° C. for 1.5 hours and subsequently distilled to remove 26.2 g. of material boiling up to 40° C./0.05 mm. (chiefly hexyl chloride) to give as residue 112.2 g. of the substantially pure bis[α-(di-n-hexyloxyphosphinyl)benzyl] piperidinophosphonite having the formula

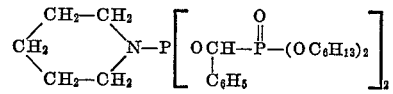

Example 3

To a mixture consisting of 135 g. (0.50 mole) of tris(β-chloroethyl) phosphite and 46.5 g. (0.25 mole) of piperidinophosphorodichloridite there was added, with cooling during 0.2 hour, 316 g. (0.70 mole) of propionaldehyde. When all of the aldehyde had been added and cooling was discontinued, the temperature of the reaction mixture increased spontaneously and during the next 0.3 hour, occasional cooling was required to maintain the temperature of the mixture at 80–90° C. When there was no longer evidence of exothermal reaction, the reaction mixture was warmed at 90–102° C. for 0.3 hour and then concentrated to 105° C./0.05 mm., to give 38.6 g. of by-product ethylene chloride in the trap which formed a part of the equipment, and as residue 183.6 g. of the substantially pure bis{1-[bis(2-chloroethoxy)phosphinyl]propyl}piperidinophosphonite of the formula

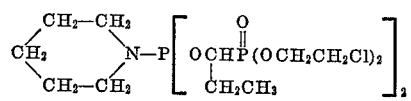

What I claim is:
1. A compound of the formula

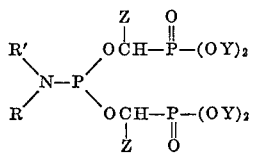

in which R is alkyl of from 1 to 5 carbon atoms, R' is selected from the class consisting of R and phenyl and in which R and R' taken together stand for a bivalent alkylene group of from 4 to 5 carbon atoms; Z is selected from the class consisting of alkyl of from 1 to 8 carbon atoms and phenyl; and Y is selected from the class consisting of alkyl and mono-chloroalkyl of from 1 to 8 carbon atoms.

2. A compound of the formula

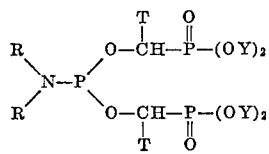

in which R is alkyl of from 1 to 5 carbon atoms and T and Y are alkyl of from 1 to 8 carbon atoms.

3. A compound of the formula

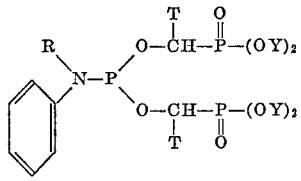

in which R is alkyl of from 1 to 5 carbon atoms and T and Y are alkyl of from 1 to 8 carbon atoms.

4. Bis[1-(diethoxyphosphinyl)propyl] methylphenylphosphoramidite.

5. Bis[α-(di-n-hexyloxyphosphinyl)benzyl] piperidinophosphonite.

6. Bis{1-[bis(2-chloroethoxy)phosphinyl]propyl} piperidinophosphonite.

References Cited in the file of this patent
UNITED STATES PATENTS 2,841,607    Hechenbleikner et al. _____ July 1, 1958
2,848,475    Schmidt _____ Aug. 19, 1958

---

UNITED STATES PATENT OFFICE
CERTIFICATE OF CORRECTION

Patent No. 3,014,910                December 26, 1961

Gail H. Birum

It is hereby certified that error appears in the above numbered patent requiring correction and that the said Letters Patent should read as corrected below.

Column 2, line 13, for "tris[3-bromo-2-cholopropyl)" read -- tris(3-bromo-2-chloropropyl) --; column 3, lines 54 and 55, for "-tolylphosphramidous" read -- -tolylphosphoramidous --; line 73, for "Cycloalkanecarboxyaldehydes" read -- Cycloalkanecarboxaldehydes --; column 6, line 58, for "316" read -- 41.6 --.

Signed and sealed this 14th day of August 1962.

(SEAL)
Attest:

ERNEST W. SWIDER                DAVID L. LADD
Attesting Officer                Commissioner of Patents

UNITED STATES PATENT OFFICE
CERTIFICATE OF CORRECTION

Patent No. 3,014,910                      December 26, 1961

Gail H. Birum

It is hereby certified that error appears in the above numbered patent requiring correction and that the said Letters Patent should read as corrected below.

Column 2, line 13, for "tris[3-bromo-2-cholopropyl)" read -- tris(3-bromo-2-chloropropyl) --; column 3, lines 54 and 55, for "-tolylphosphramidous" read -- -tolylphosphoramidous --; line 73, for "Cycloalkanecarboxyaldehydes" read -- Cycloalkanecarboxaldehydes --; column 6, line 58, for "316" read -- 41.6 --.

Signed and sealed this 14th day of August 1962.

(SEAL)
Attest:

ERNEST W. SWIDER                        DAVID L. LADD
Attesting Officer                         Commissioner of Patents